Patented July 10, 1951

2,559,674

UNITED STATES PATENT OFFICE 2,559,674

DYES OF THE THIOPHANTHRAQUINONE SERIES

Herman E. Schroeder and Lorraine A. Ringrose, Wilmington, Del., assignors to E. I. du Pont de Nemours & Company, Wilmington, Del., a corporation of Delaware No Drawing. Application June 17, 1949, Serial No. 99,878

4 Claims. (Cl. 260—152)

This invention relates to the preparation of new dyes of the thiophanthraquinone series, and more particularly to monoazoles of the following general formula:

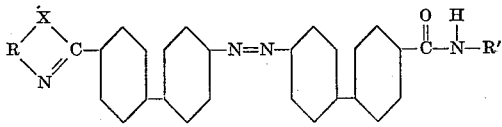

in which X stands for an element of the group consisting of sulfur and oxygen, R stands for a radical of the group consisting of thiophanthraquinone, anthraquinone and their monohalogen derivatives and R' stands for a radical of the group consisting of thiophanthraquinone, anthraquinone and their halogen, benzoylamino and thenoylamino derivatives, at least one of the radicals R and R' being of the thiophanthraquinone series which is connected to the remainder of the molecule through its benzene nucleus.

It has been recognized for many years that, in the dyes of the anthaquinone series, those in the yellow range are generally deficient in their fastness properties, more particularly with regard to fastness to light, although in general the dyes of the anthraquinone vat dye class are considered to have good fastness properties. Where yellow dyes have been found in the anthraquinone series which have good fastness properties, they are usually either dull or weak tinctorially, and therefore the various dyes in the anthaquinone vat dye class must be selected to answer the particular need at hand, balancing the question of fastness, brightness and tinctorial strength of the particular dyes available. In U. S. Patent 2,175,803 a group of symmetrical dianthraquinonediazoles, more particularly imidazoles, 1,2(N)-thiazoles and 2,1(N)-oxazoles which contain an azo group, are disclosed. These compounds dye vegetable fibers in yellowish shades and are said to exhibit good fastness to chlorine and boiling soap solution, and, in many cases, to light. It has been found, however, that these dyes are deficient in wet fastness, particularly in kier boiling, and in their vat stability. In U. S. Patent 2,228,455 a series of dianthraquinonylimides containing azo groups are disclosed which have relatively good fastness properties, but these dyes have been found to be dull and considerably weaker than the azole types of the first mentioned patent.

It is an object of the present invention to produce new and valuable dyes of the thiophan- thraquinone series which dye cotton and related fibers from the usual alkaline hydrosulfite vats in desirable yellow shades and which exhibit improved brightness, tinctorial strength and fastness properties as compared to dyes of similar shade now available. It is a more specific object of the invention to produce thiophanthraquinone vat dyes which are 4",4'''-substituted-azobiphenyl compounds carrying at least one thiophanthraquinoneazole group or anthraquinoneazole group.

The new amideazoles of azobiphenyldicarboxylic acid containing thiophanthraquinone may be prepared by ring closure of the corresponding diamides of azobiphenyldicarboxylic acid which contain halogen ortho to only one of the amino groups by usual azole ring closure. They may also be prepared by condensation (and subsequent ring closure) of a compound of the azobiphenylcarbonyliminothiophanthraquinonecarbonyl chloride series with ortho-mercapto-(or hydroxy)-aminothiophanthraquinone or ortho-mercapto - (or hydroxy) - anthraquinones by usual methods. These products may be purified by the usual acid pasting and alkaline bleaching methods.

Diimides of azobiphenyldicarboxylic acid which are suitable for preparation of the new dyes are those described in our copending application Serial No. 99,876 of the general formula:

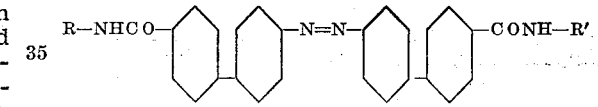

where at least one of R and R' must be thiophanthraquinone attached through its benzene nucleus, the remaining one (of R and R') may be anthraquinone, and only one of R and R' has halogen ortho to the —NH—, but either may be further substituted by acylamine and halogen. These compounds may in turn be prepared from the intermediates more particularly disclosed in our copending application Serial No. 99,874.

The new dyes of this invention dye vegetable fibers in yellow shades from orange alkaline hydrosulfite vats. The dyeings exhibit unusually good light fastness and tinctorial strength for yellow vat dyes. They exhibit the outstanding advantage over their anthraquinone analogs in that they are printing colors building up to stronger shades than the corresponding dianthraquinone derivatives, are easier to vat, and, in general, show better alkali-fastness properties. The compounds of this invention which contain two thiophanthraquinone groups show greater advantage in printing behavior and in strength build-up than those carrying only the one thiophanthraquinone group. The presence of only one thiophanthraquinone radical in these new dye molecules, however, imparts to the dye a very marked improvement in printing behavior and in strength of color to render these new dyes of very practical importance as printing colors.

The following examples are given to illustrate the invention. The parts used are by weight.

Example 1

A mixture of 270 parts of nitrobenzene, 4,4'-azobiphenyl - 4'' - (5 - carbonylaminothiophanthraquinone) - 4''' - (2 - carbonylamino - 1 - chloroanthraquinone) [prepared from 16 parts of azobiphenyldicarbonyl chloride, 8.4 parts of 5-aminothiophanthraquinone and 9.4 parts of 1-chloro-2-aminoanthraquinone as given in application Serial No. 99,876], 13 parts of potassium acetate, 13 parts of soda ash, 0.39 part of cuprous chloride, 0.13 part of copper acetate and 0.065 part of copper powder was heated at reflux (210°–215° C.) for four hours. The charge was filtered at 60° C., washed with nitrobenzene, alcohol, alkali-free with water and dried. The yellow 4,4' - azobiphenyl - 4'' - (5 - carbonylaminothiophanthraquinone) - 4''' - (1,2(N) - anthraquinone oxazole), which was purified through acid pasting and alkaline bleaching with alkaline hypochlorite, is represented by the formula:

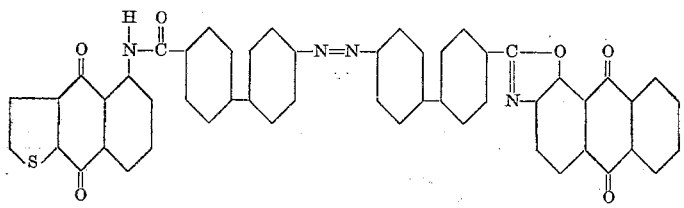

It dyes vegetable fibers in strong, bright yellow shades from an orange alkaline hydrosulfite vat and dissolves in concentrated sulfuric acid with an orange color. When applied to textiles in the usual manner in a printing gum, it affords strong bright yellow prints of good fastness.

Example 2

A mixture of 70 parts of dry nitrobenzene, 6.5 parts of 4,4'-azobiphenyl-4''-(5-carbonylaminothiophanthraquinone)-4'''-carbonyl chloride and 2.9 parts of the sodium salt of 1-mercapto-2-aminoanthraquinone (added to the acid chloride in nitrobenzene at 130° C.) was heated at 200° C. for four hours. The charge was filtered at 90° C. and the cake was washed with nitrobenzene, alcohol and water. The olive-yellow crystalline 4,4' - azobiphenyl - 4'' - (5 - carbonylaminothiophanthraquinone) - 4''' - [1,2(N) - anthraquinone thiazole], which was purified through bleaching by usual methods, is represented by the formula:

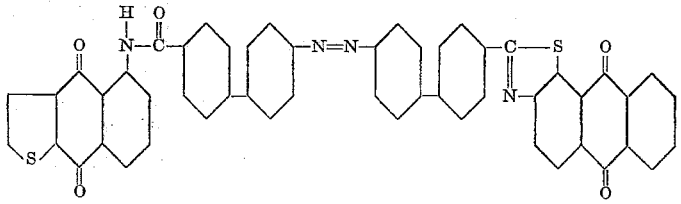

It dissolves in concentrated sulfuric acid to give an orange color and dyes vegetable fibers in strong, bright yellow shades of very good fastness from an orange alkaline hydrosulfite vat.

Example 3

A mixture of 300 parts of nitrobenzene, 14 parts of soda ash, 14 parts of potassium acetate, 0.42 part of cuprous chloride, 0.42 part of copper acetate and 4,4'-azobiphenyl-4''-(5-carbonylaminothiophanthraquinone)- 4'''-(2 - carbonyl - amino - 2,3 - dibromoanthraquinone) [prepared from 13 parts of azbiophenyldicarbonyl chloride, 6.8 parts of 5-aminothiophanthraquinone and 11.3 parts of 1,3-dibromo-2-aminoanthraquinone] was heated at reflux (210°–215° C.) for four hours. The charge was filtered at 80° C. and the cake was washed with nitrobenzene, alcohol, water and was dried. The bright yellow 4,4'-azobiphenyl-4''-(5-carbonylaminothiophanthraquinone)-4'''-[3-bromo-1,2(N)-anthraquinone oxazole], which was purified through acid pasting and alkaline bleaching, is represented by the formula:

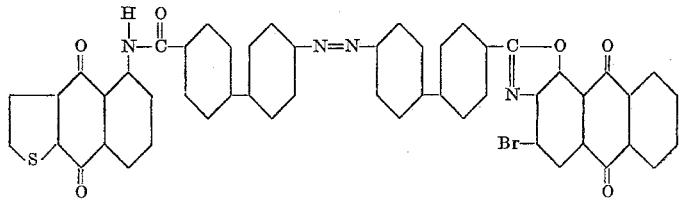

It dissolves in concentrated sulfuric acid with an orange color and dyes vegetable fibers in bright yellow shades from an orange alkaline hydrosulfite vat.

Example 4

A mixture of 260 parts of nitrobenzene, 13 parts of soda ash, 13 parts of potassium acetate, 0.39 part of cuprous chloride, 0.39 part of copper acetate and 4,4'-azobiphenyl-4''-(6-carbonylaminothiophanthraquinone - 4''' - (2 - carbonylamino-1-chloroanthraquinone) [prepared from 14 parts of azobiphenyldicarbonyl chloride, 7.3 parts of 6-aminothiophanthraquinone and 8.2 parts of 1-chloro-2-aminoanthraquinone] was heated at 210°–215° C. for four hours. The charge was filtered at 100° C. and the cake was washed with nitrobenzene, alcohol, water and was dried. The bright green-yellow 4,4'-azobiphenyl - 4'' - (6 - carbonylaminothiophanthraquinone) - 4''' - [1,2(N) - anthraquinone oxazole], which was purified through acid pasting and bleaching, is represented by the formula:

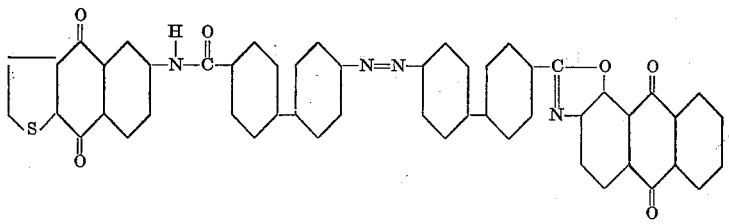

It dissolves in concentrated sulfuric acid to give an orange color and dyes vegetables fibers in yellow shades of outstanding fastness to light and wet treatments from an orange alkaline hydrosulfite vat. It also gives strong, bright, greenish-yellow prints of excellent fastness.

*Example 5*

To a mixture of 4,4'-azobiphenyl-4''-(6-carbonylaminothiophanthraquinone) - 4''' - (2 - carbonylamino-3-bromoanthraquinone) [prepared from 10 parts of azobiphenyldicarbonyl chloride, 5.2 parts of 6-aminothiophanthraquinone and 5.8 parts of 2-amino-3-bromoanthraquinone] in 150 parts of nitrobenzene was added 10 parts of soda ash, 10 parts of potassium acetate, 0.3 part of cuprous chloride and 0.3 part of copper acetate. The charge was heated at 210°–215° C. for four hours. The green-yellow 4,4' - azobiphenyl - 4'' - (6 - carbonylaminothiophanthraquinone) - 4''' - [2,3(N) - anthraquinone oxazole] was filtered at 100° C. and the cake was washed with nitrobenzene, alcohol and water, then purified by acid pasting and bleaching. It is represented by the formula:

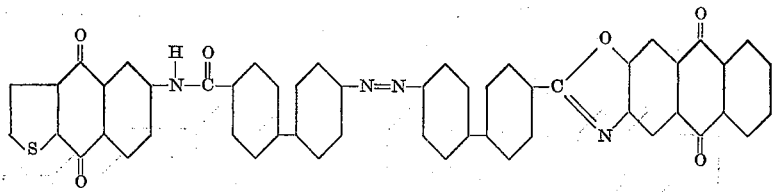

The product dyes vegetable fibers in green-yellow shades from an orange alkaline hydrosulfite vat and gives a yellow color in concentrated sulfuric acid.

This color may also be prepared from the same acid chloride and 2-amino-3-hydroxyanthraquinone in the usual manner.

*Example 6*

A mixture of 60 parts of nitrobenzene, 6.5 parts of 4,4' - azobiphenyl - 4'' - (8 - carbonylaminothiophanthraquinone) - 4''' - (2 - carbonylamino-1-chloroanthraquinone), 2.5 parts of soda ash, 2.5 parts of potassium acetate, 0.075 part of cuprous chloride and 0.075 part of copper acetate was heated at reflux (210°–215° C.) for four hours and the charge was then filtered at 60° C. The cake was washed with nitrobenzene, alcohol, water and was dried. The bright yellow 4,4'-azobiphenyl - 4'' - (8 - carbonylaminothiophanthraquinone) - 4''' - [1,2(N) - anthraquinone oxazole] which is represented by the formula:

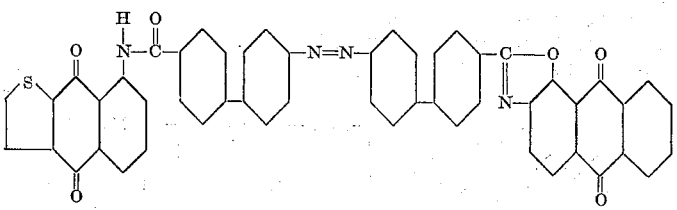

dissolves in concentrated sulfuric acid to give an orange color and dyes vegetable fibers in bright yellow shades of excellent fastness from an orange alkaline hydrosulfite vat.

*Example 7*

To a slurry of 4,4'-azobiphenyl-4''-(6-carbonylamino - 5 - chlorothiophanthraquinone) - 4''' - (1-carbonylamino - 5 - benzoylaminoanthraquinone) [prepared from 15 parts of azobiphenyldicarbonyl chloride, 9 parts of 5-chloro-6-aminothiophanthraquinone and 11.7 parts of 1-amino-5-benzoylaminoanthraquinone] in 320 parts of nitrobenzene was added 16 parts of soda ash, 16 parts of potassium acetate, 0.48 part of cuprous chloride and 0.48 part of copper acetate.

The charge was heated at 210°–215° C. for four hours, filtered at 100° C. and the cake was washed with nitrobenzene, alcohol and water. The bright yellow 4,4'-azobiphenyl-4''-[5,6(N)-thiophanthraquinone oxazole] |4'''-(1-carbonylamino - 5 - benzoylaminoanthraquinone), which was purified by acid pasting and bleaching, is represented by the formula:

4,4' - azobiphenyl-4'' - (6 - carbonylaminothiophanthraquinone) - 4''' - [5,6(N) - thiophanthraquinone oxazole] is represented by the formula:

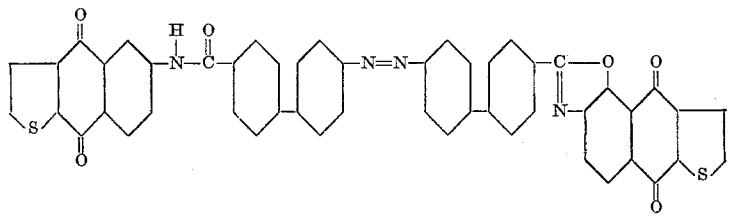

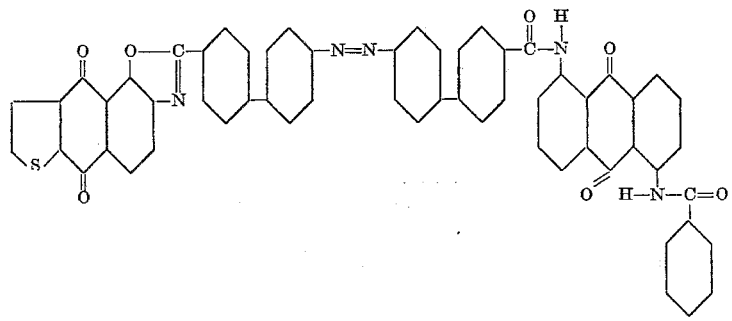

It gives an orange color in sulfuric acid and dyes vegetable fibers in yellow shades of excellent fastness from an orange alkaline hydrosulfite vat.

In place of 1-amino-5-benzoylaminoanthraquinone, 1-amino-5-thenoylaminoanthraquinone may be used to prepare

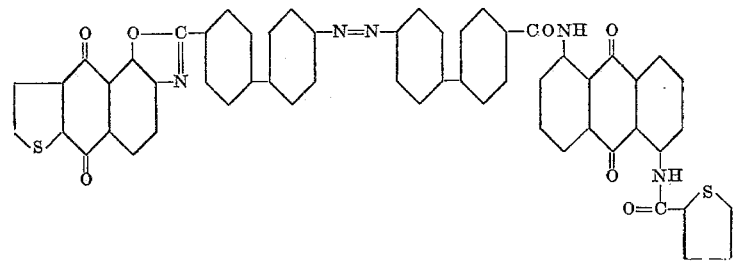

which dyes cotton in strong yellow shades.

Example 8

To a slurry of 4,4'-azobiphenyl-4''-(6-carbonylaminothiophanthraquinone) - 4''' - (6 - carbonylamino - 5 - chlorothiophanthraquinone) [prepared from 7 parts of azobiphenyldicarbonyl chloride, 3.6 parts of 6-aminothiophanthraquinone and 4.1 parts of 5-chloro-6-aminothiophanthraquinone] in 105 parts of nitrobenzene was added 6.5 parts of soda ash, 6.5 parts of potassium acetate, 0.2 part of copper acetate and 0.2 part of cuprous chloride. The charge was run and the product was isolated in the same manner as that in Example 1. The green-yellow It dyes vegetable fibers in yellow shades from a yellow-orange alkaline hydrosulfite vat and gives an orange solution in concentrated sulfuric acid.

A similar color may be prepared by starting with 7-aminothiophanthraquinone.

Example 9

To a slurry of 4,4'-azobiphenyl-4''-(6-carbonylaminothiophanthraquinone) - 4''' - carbonyl chloride [prepared from 6 parts of azobiphenyldicarbonyl chloride and 3.1 parts of 6-aminothiophanthraquinone] in 90 parts of dry nitrobenzene was added at 130° C., 4.1 parts of sodium salt of 5-mercapto-6-aminothiophanthraquinone [prepared from 5-chloro-6-aminothiophanthraquinone and sodium polysulfide in alcohol]. The charge was heated at 200° C. for four hours, then filtered at 60° C., and the cake was washed with nitrobenzene, alcohol, water and was dried. The bright yellow 4,4'-azobiphenyl-4'' - [6 - carbonylaminothiophanthraquinone] - 4'''-[5,6(N)-thiophanthraquinone thiazole] is represented by the formula:

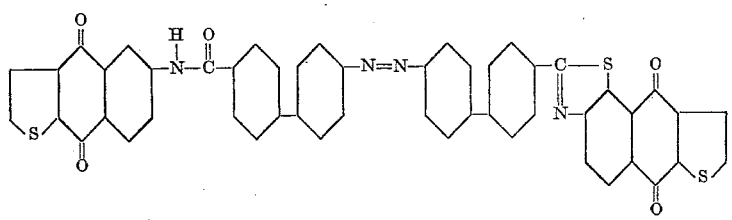

It dyes vegetable fibers in yellow shades from an orange-colored vat and gives an orange solution in concentrated sulfuric acid.

Example 10

To a suspension of 5.5 parts of 4,4'-azobiphenyl-4''-(1-bromo-2-carbonylamino-3-chloroanthraquinone)-4'''-(6-carbonylaminothiophanthraquinone) in 80 parts of nitrobenzene were added at 150° C. 3 parts of potassium acetate, 3 parts of anhydrous sodium carbonate, 0.2 part of cuprous chloride and 0.2 part of cupric acetate. The mixture was heated to reflux and maintained at that point with agitation for three hours to effect formation of the oxazole. The yellow crystalline compound which separated was filtered at 100° C., washed with nitrobenzene, alcohol and water in turn, slurried in 1% hydrochloric acid at 75° C. to remove catalysts, filtered, washed acid-free and dried. It has the structure:

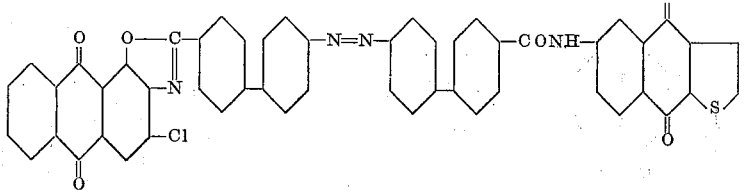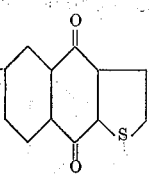

It vats at room temperature and dyes cotton bright greenish-yellow shades of excellent strength from an orange-brown alkaline hydrosulfite vat. It gives an orange solution in concentrated sulfuric acid.

Example 11

A mixture of 550 parts of nitrobenzene, 11.5 parts of 6-aminothiophanthraquinone, 0.1 part of pyridine and 33 parts of 4''-[1,2(N)anthraquinoneoxazolyl]-azobiphenyl-4'''-carbonylchloride was heated together to 150° C. and maintained at this temperature for one hour. Then the reaction mixture was heated at 210° C. for two hours. After cooling, the mass was filtered, the cake was washed with nitrobenzene, then with alcohol and dried. The product obtained is represented by the following formula:

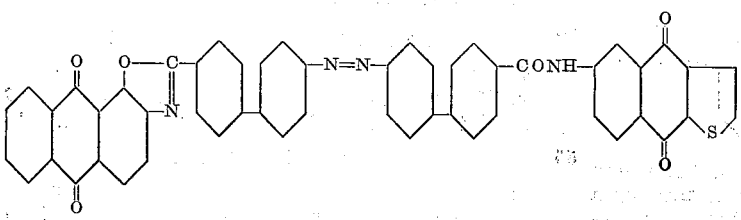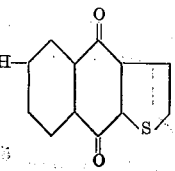

It forms a green-yellow powder and dissolves with an orange color in concentrated sulfuric acid. It dyes cotton from an orange-brown alkali hydrosulfite vat in bright yellow shades. It also gives strong, bright greenish-yellow prints of good fastness.

The acid chloride employed in this example may be prepared by condensing 1 mol of 1-chloro-2-aminoanthraquinone with 1 mol of azobiphenyldicarbonyl chloride; hydrolysis of the —COCl to the —COOH compound, ring closure to the oxazole, and acid chloride formation by means of thionyl chloride (all in situ in nitrobenzene) as more fully described in our co-pending application Serial No. 99,872.

In addition to the amide-azoles of azobiphenyldicarboxylic acid described in the foregoing examples, other valuable products of this type may be prepared by the same reactions. As further illustration of the invention, the following compounds are listed as suitable intermediates:

(a) 4,4'-azobiphenyl-4''-(5-carbonylamino-2-chlorothiophanthraquinone)-4'''-(2-carbonylamino-1-chloroanthraquinone).

(b) 4,4'-azobiphenyl-4''-(6-carbonylamino-5-chlorothiophanthraquinone)-4'''-(1-carbonylamino-6-chloroanthraquinone).

(c) 4,4'-azobiphenyl-4''-[5 (or 6)-carbonylaminothiophanthraquinone]-4'''-carbonyl chloride condensed with 1-hydroxy-2-aminoanthraquinone.

(d) 4,4'-azobiphenyl-4''-[5 (or 6)-carbonylaminothiophanthraquinone]-4'''-carbonyl chloride condensed with 1-amino-2-hydroxyanthraquinone.

The thiophanthraquinone-azole-carbonylimides of this invention are readily produced through the routes normally used for the synthesis of azoles. Oxazole-carbonylimides are prepared by treating a mono-orthohalogen diimide, preferably an alpha-mono-orthohalogen diimide, with acid binding agents and copper containing catalysts as above described. Oxazoles are also obtainable from reaction of a 4,4'-azobiphenyl-4''-carbonylaminothiophanthraquinone-4'''-carbonyl chloride with an ortho-aminohydroxythiophanthraquinone (or anthraquinone) to form the amide which is ring closed to the oxazole, usually by heating in the presence of an acidic catalyst, for example, p-toluene sulfonic acid in an inert solvent. Thiazolecarbonylimides result from reaction of the same acid chlorides with an ortho-mercaptoaminothiophanthraquinone or -anthraquinone or with its sodium salt, ring closure being effected by treatment with acidic catalysts or in the latter case by heating.

The condensations and azole ring closures may be carried out under varying conditions, depending upon the reactants employed. Elevated temperatures in the range of 140°–220° C. are usually employed, although temperatures outside of this range are occasionally necessary. The ring closures are carried out generally in the higher boiling inert organic solvents such as nitrobenzene, trichlorobenzene and naphthalene derivatives in the presence of the usual catalysts necessary for the particular reaction type.

If desired, the reactions may be carried out in sequence without isolation, e. g., by condensing an aminothiophanthraquinone with azobiphenyldicarbonyl chloride, then with a chloro-aminoor mercapto-amino-thiophanthraquinone or -anthraquinone followed by the usual ring closure.

Compounds of the present invention are new and valuable vat dyes having good light-fastness and tinctorial strength, and moreover having good printing properties.

It will be obvious to those skilled in the art that other combinations of the aminothiophanthraquinones and aminoanthraquinones may be substituted in the above examples to produce the diazole compounds of the present invention, which are all new and valuable vat dyes having very good light fastness, unusual tinctorial strength and good printing properties.

We claim:

1. The azobiphenylmonoazoles of the general formula:

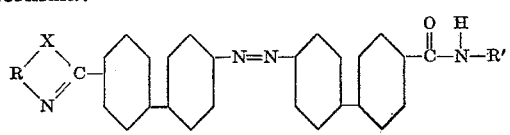

in which X stands for an element of the group consisting of sulfur and oxygen, R stands for a radical of the group consisting of thiophanthraquinone, anthraquinone and their monobromo and monochloro derivatives and R' stands for a radical of the group consisting of thiophanthraquinone, anthraquinone and their bromo, chloro, benzoylamino and thenoylamino derivatives, at least one of the radicals R and R' being of the thiophanthraquinone series which is connected to the remainder of the molecule through its benzene nucleus.

2. The azobiphenylmonoazole of the formula:

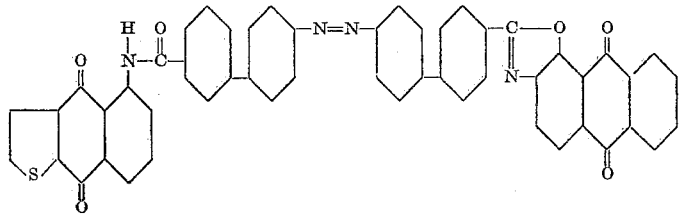

3. The azobiphenylmonoazole of the formula:

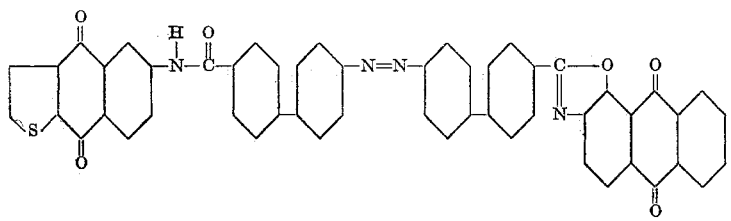

4. The azobiphenylmonoazole of the formula:

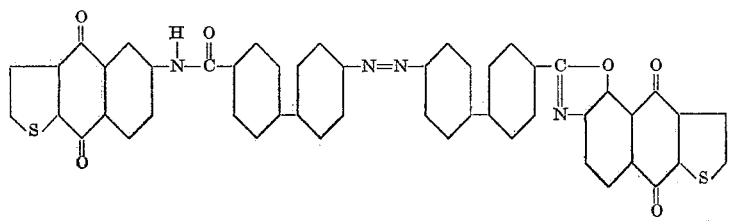

HERMAN E. SCHROEDER.
LORRAINE A. RINGROSE.

REFERENCES CITED

The following references are of record in the file of this patent:

UNITED STATES PATENTS

| Number | Name | Date |
|---|---|---|
| 2,175,803 | Honold et al. | Oct. 10, 1939 |
| 2,228,455 | Honold et al. | Jan. 14, 1941 |

FOREIGN PATENTS

| Number | Country | Date |
|---|---|---|
| 826,768 | France | Aug. 12, 1939 |
| 848,018 | France | July 17, 1939 |